Feb. 7, 1961 R. H. HARPER 2,970,916
SAUSAGE MANUFACTURE
Filed July 28, 1958
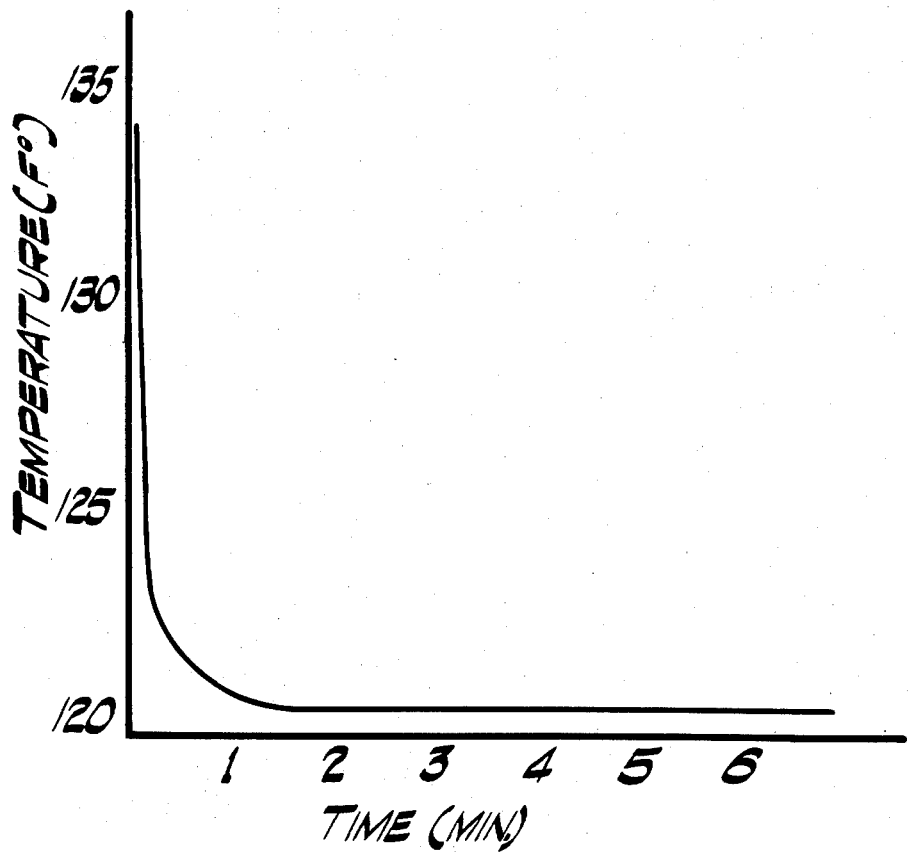
ROBERT H. HARPER
INVENTOR.
BY R.D. Story
Attorney United States Patent Office 2,970,916
Patented Feb. 7, 1961

2,970,916
SAUSAGE MANUFACTURE

Robert H. Harper, Park Forest, Ill., assignor to Swift & Company, Chicago, Ill., a corporation of Illinois Filed July 28, 1958, Ser. No. 751,403

5 Claims. (Cl. 99—109)

This invention relates to a method of processing meat products. More particularly, this invention relates to the preparation of comminuted food products or the like.

Sausage is a typical example of the type of food product with which this invention deals. The traditional method of making sausage has been to insert comminuted sausage mixture into an animal casing, a process referred to as stuffing, and to slowly cook and smoke the sausage in a suitable enclosure. A description of these procedures may be found in the book "Sausage and Meat Specialties" (Part 3 of the Packer's Encyclopedia), published by the National Provisioner in 1938, a disclosure of which is included herein by reference.

Proper cooking and smoking of sausages has three principal functions: first, it kills the bacteria, etc., which might otherwise be deleterious to the consumer and which might cause spoilage; second, it produces a color development to an extent that has come to be demanded by the public; third, it imparts to the comminuted mixture the desired flavor and gives the product the texture familiar to the purchasing public. While the first of these three functions can be obtained by the application of a given amount of heat, with little regard to how it is applied, the second and third are greatly affected by the amount and speed of application of heat and smoke. The exact details of amount and speed of application have often been closely guarded secrets. It is often dependent upon the skill and distinctive practices of a single individual in the processing plant, which skill and practices he has acquired by years of experience.

As a generalization, the cooking which takes place in what is herein referred to in general terms as the "smoke house" involves raising the temperature of the mixture in the casing up to about 160° F. over a period of about five hours. During at least a portion of this time wood smoke is introduced into the smoke house to flavor the product.

In an effort to shorten the time, one expedient has been to add a curing adjunct such as ascorbic acid to accelerate the development of cured color within the product, as well as in some cases on the surface. A second expedient has been to add an artificial coloring to the surface of the product by way of using colored casings in the stuffing of a comminuted mixture, or of adding coloring to the outside of the casings after the product is cooked. Some dye penetrates the casings to color the surface of the product within. Under these circumstances, the cooking time can be reduced to around one and one-half hours. The color arising from the artificial color on the casings will appear in the water when the sausages are subsequently cooked by the consumer. While taste is a matter of individual consideration, it is contended that the flavor development in a sausage so processed is not complete. This results in what has been described as a "short" condition, which condition has been overcome by our invention.

A third expedient used in an effort to shorten the conventional processing time of frankfurters has been to provide a two step cooking procedure as compared to the conventional single step process. In the first step the raw mix is molded to a desired form in a casing or reusable type mold and subjected to a cooking step. The protein particles of the mix are partially coagulated so that they adhere together and set the mixture. The heated mix is then stripped from the mold and the processing is continued as by the conventional smoking or cooking procedure. While the time of processing has been substantially reduced, the use of a mold, a substantial item of cost, is still necessary. If either the conventional "natural" or "artificial" casings be used as a mold, or a reusable permanent mold be employed, their utilization is both time consuming and expensive.

There has been a continually increasing demand for frankfurters which are not in casings, the so-called "skinless" frankfurters. These are produced by manufacturing the frankfurters in the usual manner and then stripping the casing from the contents before the product is packaged or sold. When this is done it is rather common to employ "artificial" casings. It will be apparent that the removal of the casings will add to the manufacturing costs of these skinless frankfurters.

It is therefore an object of this invention to provide an improved process for manufacturing a comminuted meat product.

It is another object of this invention to provide an improved process for cooking a comminuted meat product.

Still another object of this invention is to provide a process for setting up a comminuted meat mixture prior to the conventional cooking and smoking operation.

It is still another object of this invention to provide a process useful in the manufacturing of skinless sausage products.

Another object of this invention is to provide a process for cooking a sausage product without the conventional use of a mold.

Yet another object of the present invention is to provide a method whereby the processing time of sausage may be substantially reduced, while at the same time retaining the advantages of the long cooking and smoking of the historical process.

Additional objects, if not specifically set forth herein, will be readily apparent to one skilled in the art from the following detailed description of the invention.

The drawing represents a graph on which the curve depicts the relationship between time and temperature conditions of the process of this invention.

Briefly, this invention is concerned with a process for the manufacturing of at least partially cooked comminuted meat products, and includes a step wherein the raw mix is heated to effect an increase in temperature into a critical range. Under these conditions the protein in the mix is partially coagulated and there are sufficient binding properties left in the meat that sausages or other shaped meat products may be formed before the coagulation is completed. Alternately, it is possible to simultaneously cook and comminute the mix in equipment wherein the temperatures and residence time would be so interrelated that the protein would be in the denaturation range as it leaves the grinder, comminuter, or other conventional apparatus but with sufficient meat binding properties remaining to permit forming the emulsion into a permanent shape before the protein is completely coagulated. The products formed by either method may be subjected to a further cooking or smoking operation.

More particularly, this invention embraces the production of at least partially cooked products such as sausages with the use of a heat exchange system. It has been found that, if a raw sausage mix is quickly heated to partially coagulate or denature the protein, the mix may be formed into sausages before the processing is completed. Preferably the heating is intense and applied substantially uniformly throughout a given quantity of the mix to effect a quick rise of temperature into the desired range. That is, the temperature of the mix, originally at or below room temperature, is rapidly increased into a range between about 122° F. and about 160° F. Any conventional sausage mix serves well as an example of a product that may be worked through this process. The raw mix is pumped through a heat exchange system to effect a rapid increase in temperature into a range between about 122° F. and 160° F. throughout the meat mass and further processed at a sufficient rate to be formed before the mixture is completely set up. It is also possible to comminute and cook the ingredients simultaneously. In the preferred manner of performing this invention, the raw sausage mixture is maintained in the heat exchange system or grinder, comminuter, or other conventional apparatus until a temperature of about 130° F. is produced throughout the mass. Following set up of the mixture, the cooking is completed at other stages of the processing in order to more fully develop the flavor of the sausages during the balance of processing time. Equipment such as the votator may be utilized as a heat exchange system, and the Fitzpatrick Therminutor may be used if the chopping and heating are to be done simultaneously. In both methods, the mixture leaves the equipment while the protein is in the denaturation stage, having sufficient binding properties to be formed into sausages. The partially set up mixture may be extruded through a long stuffing horn to produce a continuous skinless sausage, or it may be extruded through a small orifice to improve mixing. With the latter method, a convenitional casing or reusable mold would be used. If the mixture is merely extruded through a stuffing horn, the horn should be of a length sufficient to allow the protein of the mixture to become more or less completely coagulated and the mixture itself more or less completely set up. The continuously extruded skinless sausage is then crimped or squeezed at intervals to form individual links. If a flexible tubular mold such as a natural or artificial casing is used, the walls of the tubular mold are crimped or squeezed to form the individual links. Lastly, if a reusable type mold is used, the links are formed individually. The sausages then may be further cooked and smoked.

The invention will be more fully understood from the examples which follow:

*Example I*

A conventional meat mixture for production of frankfurters was ground and chopped with addition of moisture and ice to control temperature, so that the final emulsion was produced when the temperature was approximately 55° F. This emulsion was pumped through a votator in which the temperature was raised to 130° F., with a residence time of approximately three seconds. The meat emulsion was extruded through a stuffing horn attached to the votator and separated into individual frankfurers as it left the horn. Following this, the frankfurters were processed by standard cooking and smoking procedures.

*Example II*

In gredients of conventional frankfurter mix were pumped through a Fitzpatrick Therminutor at a rate which would produce a final temperature of 130° F. in the extruded emulsion. This permitted the simultaneous cooking and chopping with the residence time of approximately three seconds, and the emulsion was continuously extruded into a flexible tubular mold. The walls of the mold were crimped together to form individual links and the mold was stripped from the frankfurters so formed. Sausages were then subjected to the conventional cooking and smoking operation employed in the production of tender franks.

In the processes herein described, the time within which the product must be gotten into a mold or otherwise shaped into sausages after heating is a function of the temperature to which the product was heated. In the examples disclosed, a temperature of 130° F. was used and the time limit at that temperature was found to be three seconds. It is possible, however, to go substantially above 130° F. with a corresponding decrease in maximum handling time, but under these circumstances the emulsion would have to be cured with nitric oxide rather than with normal nitrate-nitrite curing ingredients, with or without curing adjuncts such as ascorbic acid which accelerate the development of cured meat color. Curing meat emulsions with nitric oxide is covered in the patent application under Serial No. 644,793, now Patent No. 2,898,722, a continuation-in-part of the application under Serial No. 490,419, now abandoned, the disclosures of which are included herein by reference.

It is believed that reference to the accompanying graph as shown in the drawing will more clearly indicate this time-temperature relationship.

Referring now to the graph, it will be seen that the ordinate represents the temperature to which the product is heated while the abscissa represents the time in minutes within which the product must be gotten into a mold or otherwise shaped. The curve represents the time limits at temperatures ranging from about 120° F. to about 135° F. The temperatures relate to the internal temperature of the mix without reference to temperatures of the operating equipment.

The method described herein can be used with any type of comminuted meat mix, such as frankfurter emulsion, the continuous phase of which is predominantly lean meat. The mixture is heated, or the ingredients simultaneously heated and chopped, so that the discrete protein particles are at least partially coagulated to form a bond. This produces a matrix to hold the molded shape of the mass. The presence of fat or other ingredients thus does not interfere with the set of the product when sufficient lean meat is present to produce the desired matrix. Partial coagulation of a sausage, such as is produced at a temperature of 130° F., sets the product so that the links can be easily handled throughout the remaining process steps.

It has been proposed in the past to form a skin on the outside of sausage products, as by molding the raw mixture and subjecting the mold to heat, hot water, steam, etc. It has been noted that in this handling of a sausage mixture a matrix is not formed throughout the mass as when the setting up of the raw mixture is performed in a heat exchange system, followed by the shaping of sausages in the manner described above. Without the formation of a matrix throughout the mass, the center portion remains soft and mushy. Such a product is not self-sustaining and breaks easily. Further, because of the formation of a coagulated outer skin, the product does not have a uniform texture, and also the relatively hard skin which must be formed to hold such a mass together interferes with smoke penetration and flavor development.

When a product is set up in a heat exchange system and shaped into sausages, as distinguished from the forming of a skin on a product with heat, hot water, steam or the like, a uniform texture can be produced therein without the development of a crust. There can be no overcooked skin on the individual links while at the same time a supporting matrix is produced in the mass to hold it together during the remaining processing steps.

Not only may the heating be performed more rapidly in a heat exchange system, but, upon heating the mass evenly throughout, the bacteria which may be present are not permitted to grow as in the early heating period of a conventional process, and are thus more readily destroyed. Thus, in the manufacturing of a comminuted product the instant process contributes to wholesomeness in the more rapid handling of the product which minimizes growth of bacteria.

Because of the uniform texture produced in the sausage mix, the smoke penetration produced in the product is found to be more satisfactory. The use of a casing or the production of a skin on the surface of a product obviously tends to retard penetration of the smoke into the mass and, in the case wherein a skin formation takes place as in treating with heat, hot water, steam, or the like, over-treatment of the skin usually takes place during the smoking so as to produce a crust. The instant process tends to eliminate these difficulties.

The basic principles of this invention can be performed in either a continuous or intermittent cycle. The fundamental aspect of this invention is concerned with the heating of an emulsion, or simultaneous chopping and heating of the emulsion ingredients, to a temperature at which coagulation of the protein will occur, and shaping the emulsion into individual units after heating and before the denaturation of the protein is complete so that the denaturation will be completed after the product is shaped and the emulsion will set up into a self-sustaining form.

It is clear that many modifications and variations of the invention as hereinbefore set forth may be made without departing from its spirit and scope, and therefore only such limitations should be imposed as are indicated in the appended claims.

I claim:

1. The method of manufacturing sausage comprising: simultaneously comminuting a sausage mixture to a fluid consistency while partly coagulating by intensely heating substantially uniformly all portions of said mixture to a temperature between about 122° F. and 160° F. and upon attaining the desired temperature forming a given mass of said mixture into a desired shape.

2. The method of claim 1 wherein the shaped mixture is subsequently cooked.

3. The method of manufacturing sausage comprising: simultaneously comminuting a sausage mixture to a fluid consistency while partly coagulating by intensely heating substantially uniformly all portions of said mixture to a temperature of about 130° F. and upon attaining said temperature forming a given mass of the mixture into the desired shape before said coagulation is substantially complete.

4. The method in claim 3 wherein the shaped mixture is subsequently cooked.

5. The method of manufacturing frankfurters comprising: simultaneously comminuting a frankfurter mixture to a fluid consistency while partly coagulating by intensely heating substantially uniformly all portions of said mixture to a temperature between about 122° F. and 160° F. and upon attaining the desired temperature forming a given mass of said mixture into a desired shape.

References Cited in the file of this patent

UNITED STATES PATENTS

| | | |
|---|---|---|
| 1,009,953 | Boyle | Nov. 28, 1911 |
| 2,086,338 | Sodergreen | July 6, 1937 |
| 2,182,211 | Paddock | Dec. 5, 1939 |
| 2,685,518 | Prohaska | Aug. 3, 1954 |
| 2,860,991 | Christianson et al. | Nov. 18, 1958 |
| 2,860,992 | Voegeli et al. | Nov. 18, 1958 |